No. 752,001. PATENTED FEB. 9, 1904.
R. D. SCOTT.
TRANSMISSION GEAR FOR POWER DRIVEN VEHICLES.
APPLICATION FILED JULY 20, 1903.
NO MODEL. 2 SHEETS—SHEET 1.

WITNESSES—
A. N. B. Emery.
A. K. Hood.

INVENTOR—
Rufus D. Scott,
By his Atty.
Henry W. Williams

No. 752,001. Patented February 9, 1904.

UNITED STATES PATENT OFFICE.

RUFUS D. SCOTT, OF BEVERLY, MASSACHUSETTS, ASSIGNOR TO ALBERT G. ROPES, OF MORRISTOWN, NEW JERSEY.

TRANSMISSION-GEAR FOR POWER-DRIVEN VEHICLES.

SPECIFICATION forming part of Letters Patent No. 752,001, dated February 9, 1904.

Application filed July 20, 1903. Serial No. 166,279. (No model.)

*To all whom it may concern:*

Be it known that I, RUFUS D. SCOTT, a citizen of the United States, residing in Beverly, in the county of Essex and State of Massachusetts, have invented a new and useful Improvement in Transmission-Gears for Power-Driven Vehicles, of which the following is a specification.

This invention relates particularly to transmission-gears for vehicles driven by explosive-engines. My improved differential gear is adapted to be applied to the intermediate shaft, which is driven by the engine, the mechanism being adapted to be connected in any suitable manner, as by a sprocket, with differential gears on the rear axle or rear wheels.

The invention has for its principal object to enable the operator to increase or lessen the speed or to reverse in a simple, economical, and efficient manner, all as fully described below, and illustrated in the accompanying drawings, in which—

Figure 1:
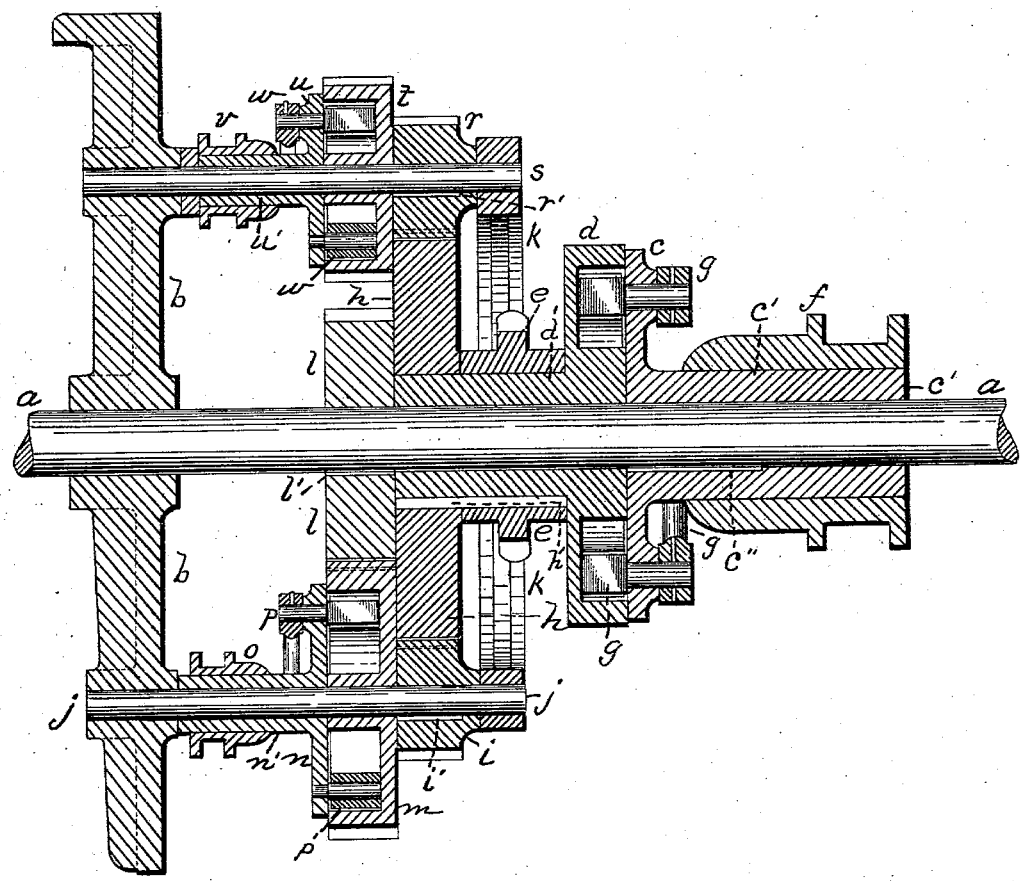
Figure 2:
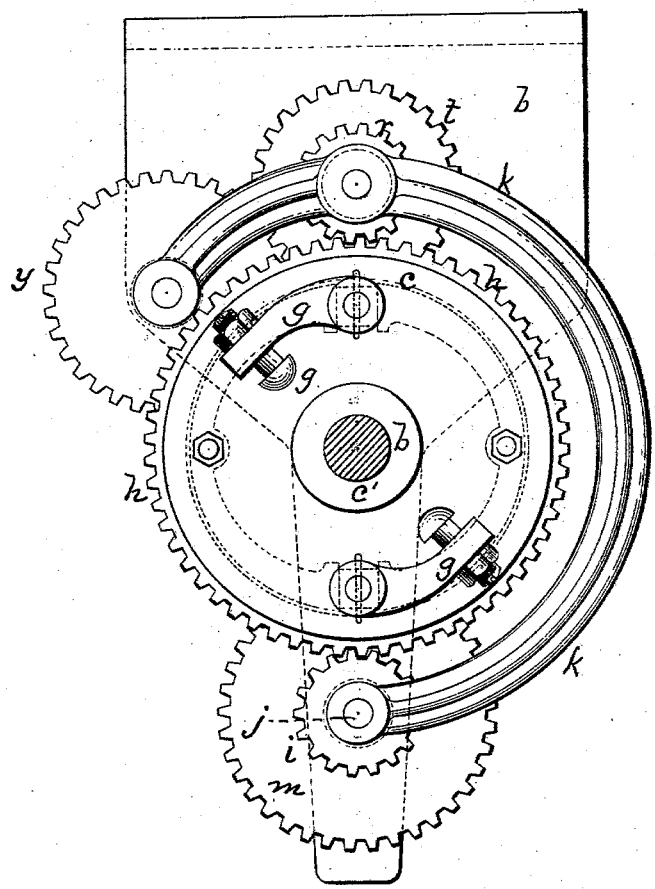

Figure 1 is a longitudinal section of my improved mechanism, the intermediate shaft and the other shafts being shown in elevation. Fig. 2 is an end or side elevation looking toward the left, with the cone $f$ removed and the differential shaft shown in section.

Similar letters of reference indicate corresponding parts.

$a$ represents the intermediate shaft, which is driven by the engine in any suitable manner and which is supported by a suitable hanger $b$, sustained by the carriage. Keyed at $c''$ to this shaft is the hub $c'$ of the member $c$ of a friction-clutch of any suitable construction, which is adapted to engage the other member $d$, which is journaled on the shaft and whose hub $d'$ is provided with a sprocket $e$, which may be connected by any suitable mechanism with the rear axle or rear wheels, and thus impart motion thereto.

$f$ represents a cone adapted to be moved on the hub $c'$ by any suitable mechanism actuated by the operator into engagement with a spreading mechanism $g$, (not new in this invention,) whereby the clutch member $c$ imparts rotation to the clutch member $d$.

Keyed at $h'$ to the hub or sleeve $d'$ is the gear-wheel $h$, which engages with the small gear-wheel $i$, keyed at $i'$ to a shaft $j$, which is supported by a bracket $k$, sustained by the carriage and the hanger $b$. A gear-wheel $l$ is keyed at $l'$ to the shaft $a$ and engages the loose member $m$ of a friction-clutch whose other member, $n$, has its hub $n'$ keyed to the shaft $j$, said clutch being operated by a cone $o$ and spreading mechanism $p$ in the same manner as the clutch $c\ d$. Also meshing into the gear-wheel $h$ is the gear-wheel $r$, keyed at $r'$ to a shaft $s$, which is supported in the bracket $k$ and hanger $b$, and loose on this shaft $s$ is the member $t$ of a clutch whose member $u$ has a hub $u'$ keyed to said shaft and operated by a suitable cone $v$ and spreading mechanism $w$.

Motion is communicated from the shaft $a$ by engaging the two members of the clutch $c\ d$ by operating the cone $f$ in the ordinary manner. The member $d$, as above mentioned, communicates motion to the rear axle and wheels through the medium of the sprocket-wheel $e$ on the hub or sleeve $d'$. When increased speed is desired, the operator moves the clutch members $c\ d$ out of engagement and by means of suitable mechanism actuates the cone $o$ in the ordinary manner to move the clutch member $n$ into engagement with the clutch member $m$. The shaft $a$ under those circumstances rotates the gear-wheel $l$, which imparts rotation to the clutch $m\ n$ and thence to the shaft $j$, which rotates the gear $i$, which imparts rotation to the gear $h$ and through the hub $d$ to the sprocket $e$, which is connected with the rear axle.

When it is desired to reverse the machine, the cones $f$ and $o$ are placed out of engagement with their clutches, and the cone $v$ is operated to place the clutch members $t\ u$ in engagement, with the result that the gear-wheel $l$ actuates an intermediate gear $y$, Fig. 2, mounted on the machine, said intermediate gear being in engagement with the gear-wheel $l$ and the clutch $t$, and hence reverse motion is communicated from the gear $l$ to said clutch $t$, and thence through the shaft $s$ to the gear $r$, and thence through the gear $h$ and hub or sleeve $d'$ to the sprocket $e$.

Thus it will be seen that slow, fast, or reverse motion can be applied to the rear axle and wheels by operating the cone $f$, the cone $o$, or the cone $v$ and their respective clutches.

Having thus fully described my invention, what I claim, and desire to secure by Letters Patent, is—

1. In a transmission-gear of the character described, an intermediate shaft adapted to be driven by the engine; a clutch having one of its members keyed to said shaft; mechanism within the control of the operator for moving said clutch members into engagement; mechanism rigid with the loose member of said clutch whereby motion can be communicated to the rear axle or wheels; an additional shaft $j$ supported by the carriage; a clutch having one of its members keyed to said shaft $j$; mechanism within the control of the operator for moving said clutch members into engagement; a gear-wheel rigid on the intermediate shaft and in engagement with the clutch on the shaft $j$; and intermeshing gear-wheels rigid respectively with the shaft $j$ and the loose member of the clutch on the intermediate shaft, whereby a plurality of speeds may be communicated from the intermediate shaft to the mechanism connecting with the driving axle or wheels.

2. In a transmission-gear of the character described, an intermediate shaft adapted to be driven by the engine, a clutch having one of its members keyed to said shaft; mechanism within the control of the operator for moving said clutch members into engagement; mechanism rigid with the loose member of said clutch whereby motion can be communicated to the rear axle or wheels; an additional shaft $s$ supported by the carriage; a clutch mechanism having one of its members keyed to said shaft $s$; mechanism within the control of the operator for moving said clutch members into engagement; a gear-wheel rigid on the intermediate shaft; a gear-wheel intermediate of and in engagement with said gear-wheel and the loose member of the clutch on the shaft $s$; and intermeshing gear-wheels rigid respectively with the shaft $s$ and loose members of the clutch on the intermediate shaft, whereby reverse motion may be communicated from the intermediate shaft to the mechanism communicating with the driving axle or wheels.

In testimony whereof I have signed my name to this specification in the presence of two subscribing witnesses.

RUFUS D. SCOTT.

Witnesses:
BENJAMIN B. MURRAY,
EDWARD ELDRED.